US012628211B2

(12) United States Patent
Meiyappan

(10) Patent No.: US 12,628,211 B2
(45) Date of Patent: May 12, 2026

(54) SYSTEMS AND METHODS FOR TRACKING TELECOMMUNICATIONS EQUIPMENT IN A BLOCKCHAIN

(71) Applicant: ECSite, Inc., Santa Clara, CA (US)

(72) Inventor: Subramanian S. Meiyappan, San Jose, CA (US)

(73) Assignee: ECSite, Inc., Santa Clara, CA (US)

( * ) Notice: Subject to any disclaimer, the term of this patent is extended or adjusted under 35 U.S.C. 154(b) by 643 days.

(21) Appl. No.: 17/972,217

(22) Filed: Oct. 24, 2022

(65) Prior Publication Data

US 2023/0128825 A1 Apr. 27, 2023

Related U.S. Application Data

(60) Provisional application No. 63/270,931, filed on Oct. 22, 2021.

(51) Int. Cl.
| | |
|---|---|
| *H04W 76/11* | (2018.01) |
| *H04W 68/04* | (2009.01) |
| *H04W 74/00* | (2009.01) |

(52) U.S. Cl.
CPC ............ *H04W 76/11* (2018.02); *H04W 68/04* (2013.01); *H04W 74/002* (2013.01)

(58) Field of Classification Search
CPC .... H04W 76/11; H04W 68/04; H04W 74/002
See application file for complete search history.

(56) References Cited

U.S. PATENT DOCUMENTS

| | | | | |
|---|---|---|---|---|
| 11,853,285 B1 * | 12/2023 | Ekins | ...................... | G06F 16/27 |
| 2009/0228375 A1 * | 9/2009 | Ford | .................. | G06Q 30/0201 |
| | | | | 705/28 |
| 2015/0213444 A1 * | 7/2015 | McEntee | ................ | G06Q 40/04 |
| | | | | 705/44 |
| 2017/0039644 A1 * | 2/2017 | Palmer | ................ | G06F 16/2365 |
| 2017/0359417 A1 * | 12/2017 | Chen | ...................... | H04W 60/04 |
| 2021/0209079 A1 * | 7/2021 | Lynch | .................... | G06F 16/27 |
| 2023/0360300 A1 * | 11/2023 | De Brouwer | ........... | G06F 21/16 |
| 2023/0367636 A1 * | 11/2023 | Dande | ................... | G06F 9/5016 |
| 2023/0394426 A1 * | 12/2023 | Bauders | .............. | G06Q 10/087 |

* cited by examiner

*Primary Examiner* — Mewale A Ambaye
(74) *Attorney, Agent, or Firm* — Dority & Manning, P.A.

(57) ABSTRACT

Systems and methods are provided for accurately tracking physical objects such as telecommunications equipment. In example embodiments, a blockchain is provided for accurately tracking physical objects such as telecommunications equipment.

20 Claims, 8 Drawing Sheets

IDENTIFY A UNIQUE IDENTIFIER ASSOCIATED WITH THE TELECOMMUNICATION DEVICE

802

RECEIVE LIFECYCLE EVENT DATA BASED ON INPUT FROM A USER, WHEREIN THE LIFECYCLE EVENT DATA DESCRIBES A CURRENTLY OCCURRING EVENT IN THE LIFECYCLE OF A TELECOMMUNICATIONS DEVICE

804

AUTOMATICALLY GENERATE A LOG ENTRY INCLUDING THE UNIQUE IDENTIFIER AND THE LIFECYCLE EVENT DATA

806

ADD THE LOG ENTRY TO A BLOCKCHAIN LEDGER

808

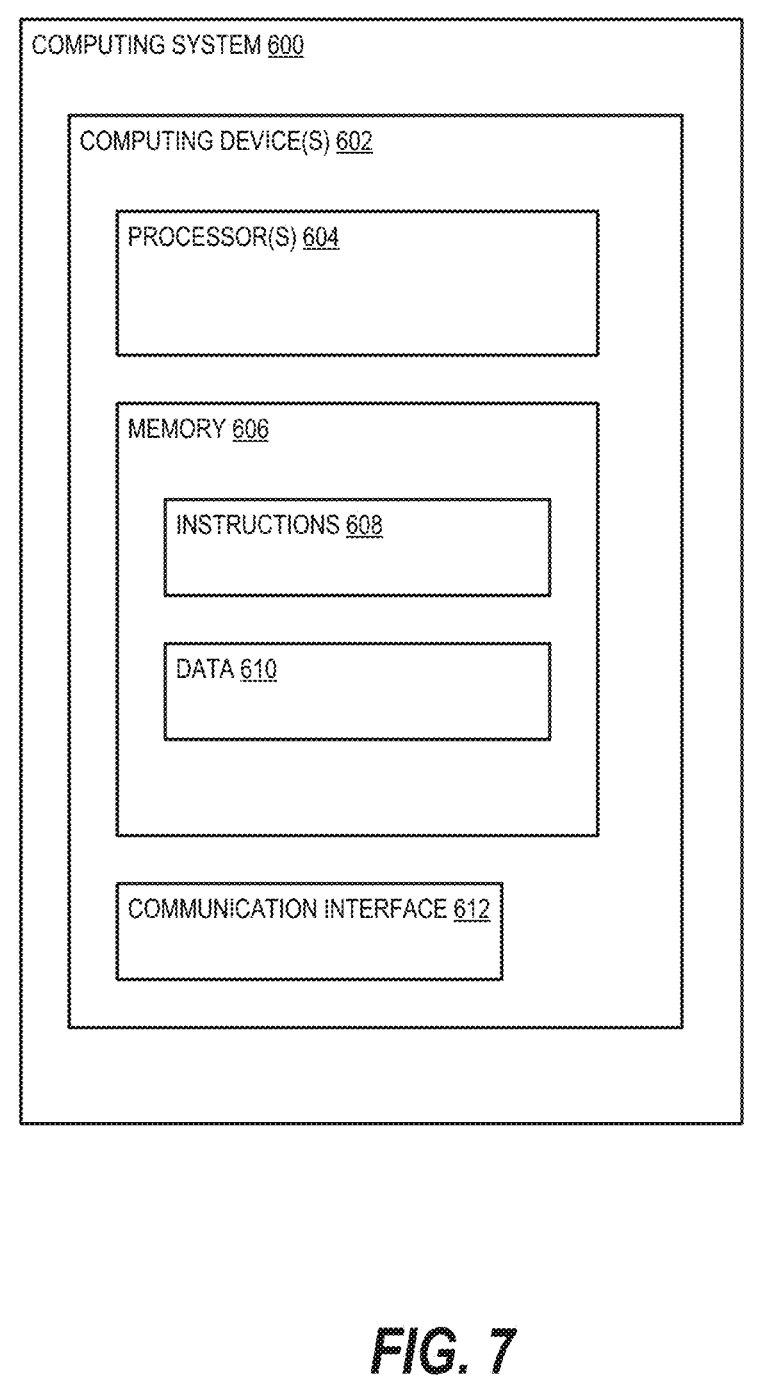

COMPUTING SYSTEM 600

COMPUTING DEVICE(S) 602

PROCESSOR(S) 604

MEMORY 606

INSTRUCTIONS 608

DATA 610

COMMUNICATION INTERFACE 612

*FIG. 7*

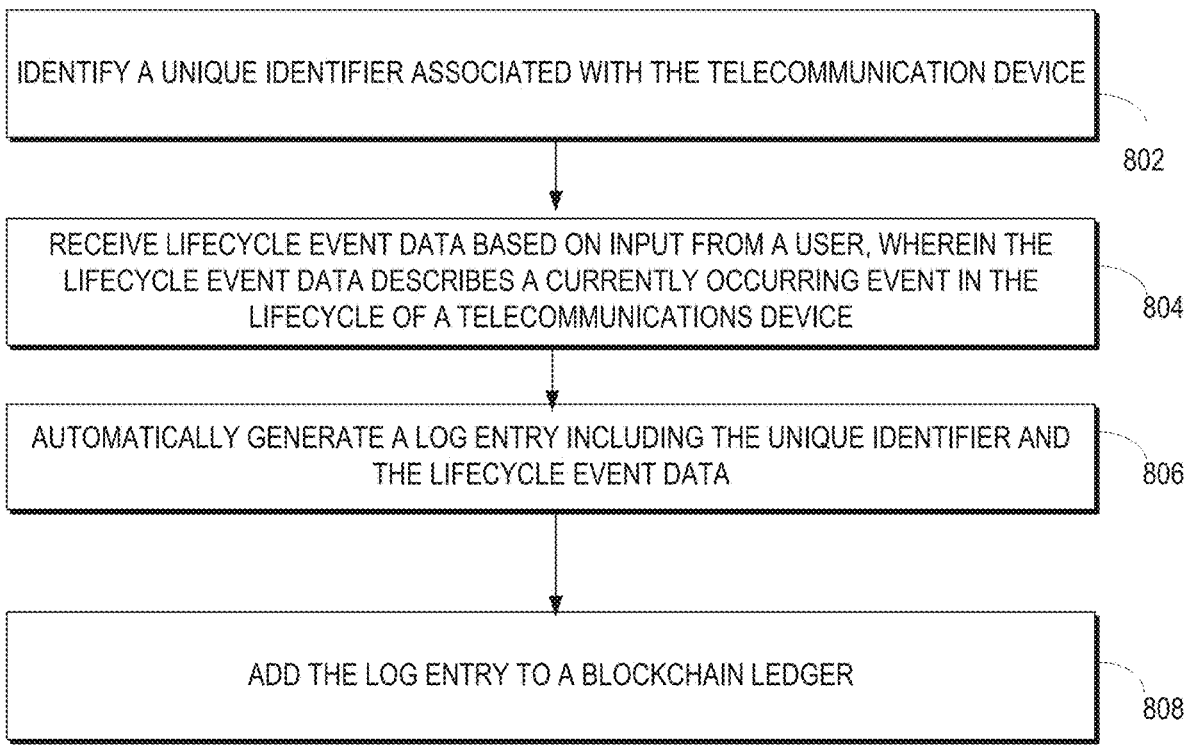

IDENTIFY A UNIQUE IDENTIFIER ASSOCIATED WITH THE TELECOMMUNICATION DEVICE

802

RECEIVE LIFECYCLE EVENT DATA BASED ON INPUT FROM A USER, WHEREIN THE LIFECYCLE EVENT DATA DESCRIBES A CURRENTLY OCCURRING EVENT IN THE LIFECYCLE OF A TELECOMMUNICATIONS DEVICE

804

AUTOMATICALLY GENERATE A LOG ENTRY INCLUDING THE UNIQUE IDENTIFIER AND THE LIFECYCLE EVENT DATA

806

ADD THE LOG ENTRY TO A BLOCKCHAIN LEDGER

SYSTEMS AND METHODS FOR TRACKING TELECOMMUNICATIONS EQUIPMENT IN A BLOCKCHAIN

FIELD

The present disclosure relates to retaining equipment information for lifecycle tracking of physical objects including telecommunications equipment such as cables, connectors, fibers, amplifiers, attenuators, antennas, and the like.

BACKGROUND

Modern advanced telecommunications systems involve a vast range of equipment and devices that each have their own respective lifecycles.

BRIEF DESCRIPTION OF FIGURES

Detailed discussion of embodiments directed to one of ordinary skill in the art are set forth in the specification, which makes reference to the appended figures, in which:

FIG. 7 illustrates a block diagram of an example of a computing system in accordance with embodiments of the present disclosure; and FIG. 8 depicts an example flow diagram for a method of tracking a lifecycle of a telecommunications device according to example embodiments of the present disclosure.

DETAILED DESCRIPTION

Figure 1:
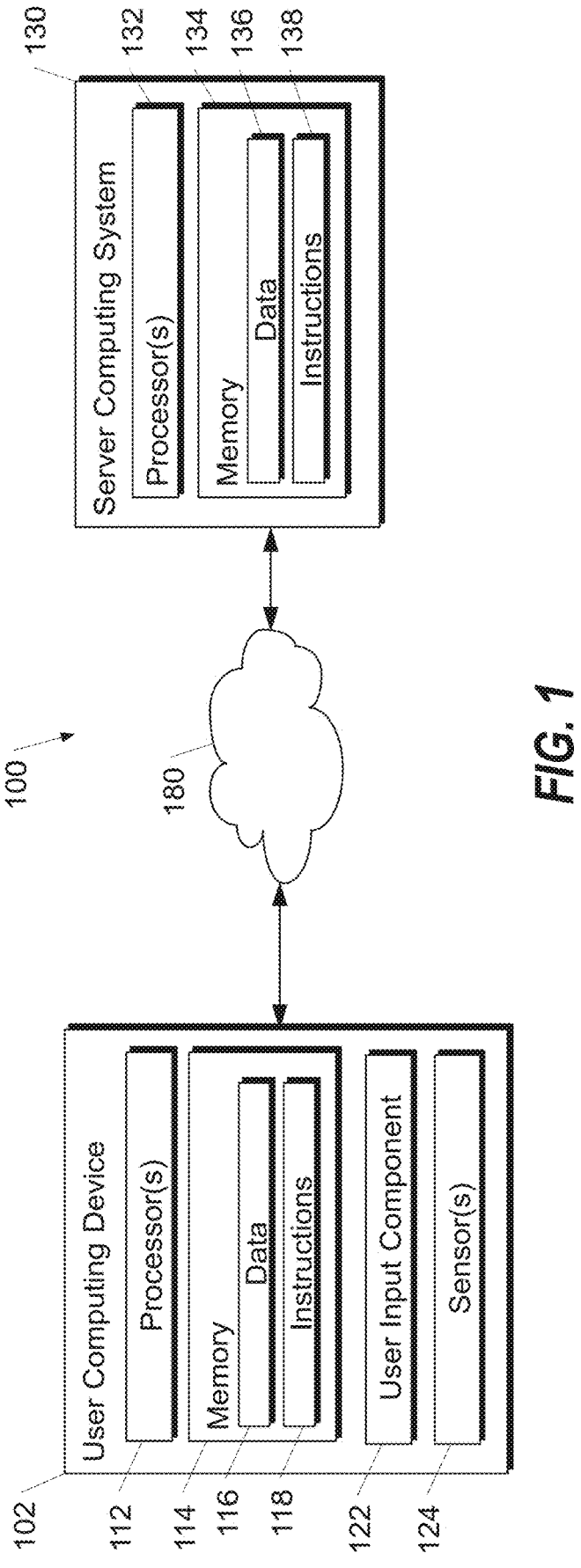
FIG. 1 is a block diagram depicting an example of a computing system in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled,"

"fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes" "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Approximating language, as used herein throughout the specification and claims, is applied to modify any quantitative representation that could permissibly vary without resulting in a change in the basic function to which it is related. Accordingly, a value modified by a term or terms, such as "about," "generally," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a ±10 percent margin. When used in the context of an angle or direction, such terms include within ten degrees greater or less than the stated angle or direction. For example, "generally vertical" includes directions within ten degrees of vertical in any direction, e.g., clockwise or counterclockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, embodiments in accordance with the present disclosure are directed to systems and methods for retaining equipment information in a blockchain database.

Modern advanced telecommunications systems involve a vast range of equipment such as cables, connectors, fibers, amplifiers, attenuators, antennas, and a large array of additional devices. Each device has a life cycle. Example life cycles may include:

1. The device is manufactured;
2. The device is transported;
3. The device is installed;
4. The device is tested, and perhaps photographed;
5. The device is maintained, updated, or repaired;
The device is monitored, tested, or reset (e.g., an amplifier);
6. Reports are created about the device's test results, update procedures, and so on;
7. Eventually, the device is replaced; and
8. The device may be destroyed/recycled, or it may be installed in a different location, where the cycle begins again.

This is a simplified example but gives the general context of what happens to each piece of equipment in a complex installation of telecommunications equipment. Many other steps could be added to the life cycle sequence. Moreover, steps may be removed from the life cycle sequence. It is noted that telecommunications equipment is provided by way of example and not limitation. Embodiments of the present disclosure include systems and methods for retaining information in a blockchain database for any type of physical object such as equipment.

According to example embodiments, multiple pieces of telecommunications equipment together can form a connected infrastructure where optimal functional is critical: the world depends on a reliable telecommunications system to support every type of communication. In many places the reliability of this infrastructure is essential to life-critical functions. Entire countries, economies, militaries, and other systems depend on this equipment.

Because of this high-reliability requirement, the life cycle of each piece of equipment needs to be carefully tracked from beginning to end. This is commonly referred to as cradle to grave: the following of a device at every step of its existence.

Historical methods of tracking equipment status have depended on proprietary systems based on paper or databases: spreadsheets, SQL databases, and the like. Such systems are not portable and are generally not comprehensible, or even accessible, to every individual who may need to see the state of one particular piece of equipment.

Imagine, for example, a technician called to repair a system at a customer site. The technician might diagnose the problem to, say, a faulty amplifier. At this point the technician may need to know the exact state of the amplifier: its date of manufacture, its revision level (whether it's hardware or software has been updated, and if so to what level), its repair history, and so on. This information is rarely available readily, so it might be more expedient for the technician to simply replace the amplifier and complete the job, whereas if the history of the device had been available, a different solution (perhaps a software upgrade to the latest release) would have been sufficient. This latter solution would perhaps have resulted in a lower cost, less wasteful solution to the customer.

Aspects of the present disclosure are directed to a method of tracking the life cycle of objects such as telecommunications devices. In example embodiments, one or more telecommunications devices may be tracked. In some implementations, the telecommunications devices that make up one or more networks can be tracked. In accordance with example embodiments a blockchain is provided to track the life cycle of objects such as telecommunications devices. A blockchain can be used as a digital ledger in example embodiments, such as a publicly distributed ledger.

A digital ledger for tracking objects may use or include a blockchain as an online database that may be used to store information of any type. The data can be stored in units called blocks which can be chained together electronically. That is, two adjacent blocks in the chain point to each other, so the chain can be followed both ways (upwards or downwards, so to speak). When new data needs to be added, it is entered into a new block, which is placed at the head of the chain. Consequently, the blocks are always in chronological order. This sequence of information-holding blocks chained together gives rise to the name blockchain. The entries in the blockchain are frequently referred to as a ledger since they often contain financial information.

Typically, a blockchain is publicly accessible via easily available software tools and applications (e.g., software programs) can be created for any platform such as a handheld device such as a phone or tablet, a desktop computer, and so on.

FIG. 1 depicts a block diagram of an example computing system 100 that can be used to implement one or more embodiments of the present disclosure. The system 100 can include a user computing device 102 and a server computing system 130 that are communicatively coupled over one or more networks network 180. It will be appreciated that the system of FIG. 1 is provided by way of example and not limitation as other computing systems may be used in accordance with example embodiments of the present disclosure.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. Electronic items and/or data describing electronic items can be stored in one more local memory locations of the user computing device 102. For example, the local memory location can correspond with the memory 114.

The user computing device 102 can also include one or more user input components 122 that receives user input. For example, a user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as microphones, cameras, temperature sensors, accelerometers, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Blockchain transactions can be represented as messages that can be transported between computing nodes using network 180 for example. All messages are not required to contain a full representation of a transaction. In some examples, however, an implementation may specify that all messages contain a full representation of a transaction. Distributed systems containing blockchain elements can include all of the contents of that blockchain in example embodiments. A digest of a transaction may be made available to one or more computing systems to make elements of a system aware of the existence of a transaction, and to provide a robust way to check the integrity of messages containing full transactions. This enables complete and efficient propagation of incoming transaction messages to the appropriate elements. It also reduces the network loading associated with traditional protocols and yet provides protection. Other examples of recording and making a transaction available may be used.

A block generally refers to an aggregation or association of transaction data. There is no specific format required. A blockchain is a continuously growing list of records, called blocks, that are linked and secured using cryptography. Each block in a blockchain typically contains a cryptographic hash linking to the previous block, and transaction data. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Other organizations of transaction data may be used. A blockchain is one example of a mechanism to record transaction data. The architecture and associated transport mechanism of this disclosure system may be applicable to other organizations of transaction data. A blockchain, as in a chain or sequence of blocks, may be any organization of blocks including, without limitation, a block tree, a block graph, or the like. Any blockchain and/or block sequence allocation method can be used in accordance with example embodiments.

Figure 2:
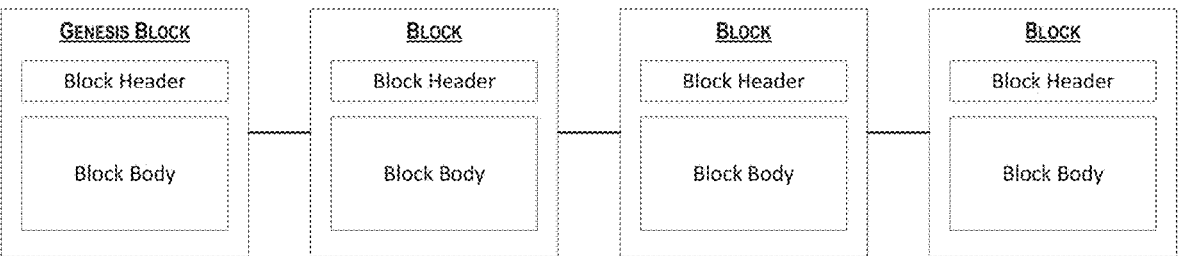
FIG. 2 is a block diagram depicting an example blockchain architecture in accordance with example embodiments of the present disclosure.
Figure 2:
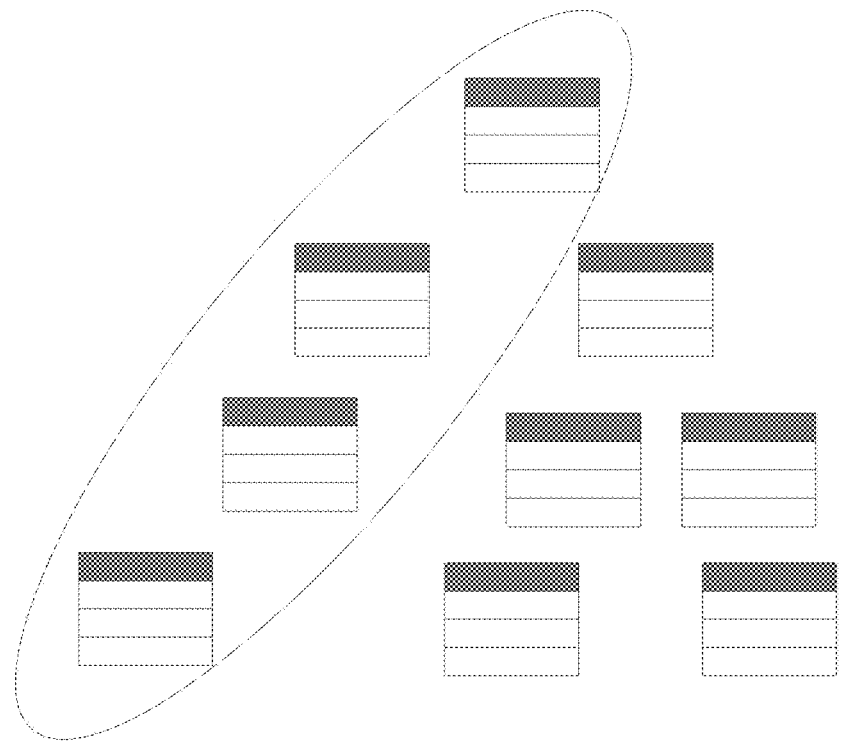

FIG. 2 is a block diagram depicting an example blockchain architecture in accordance with example embodiments of the present disclosure. Each blockchain can include a linked hierarchical list of transaction blocks. Chains of related, linked transaction blocks within the hierarchy stem from an initial genesis block. Each block has a cryptographic identity, which is calculated by the header data in the block. Each block contains the hash of the previous block in the chain. Other blockchain architectures may be used in accordance with example embodiments of the present disclosure.

Embodiments of the present disclosure are directed to systems and methods that employ one or more blockchains to permanently retain all relevant information about objects such as installed telecommunications equipment. At each stage of a device's life cycle, information describing the attributes of that particular life cycle stage can be entered into a blockchain. This information becomes part of the permanent record of that device's history. The process of entering the device-specific information into a blockchain may be referred to as digital journaling. According to example aspects, a blockchain can be used as a distributed leger.

According to example aspects of the present disclosure, a device's life cycle can be tracked using a blockchain to provide a robust and dependable solution. Each equipment may have a unique equipment identifier. This identifier allows one specific device to be followed accurately at every step of its manufacture and use. Methods that are suitable for such identification include, but are not limited to, barcodes and RFID (Radio Frequency Identification) tags. RFID tags, or smart labels, consist of a small circuit and an antenna. They contain device-specific information and may be interrogated by a small handheld scanner. Other methods of identification can be used.

The device-specific identifier may be referred to as a digital fingerprint in the present disclosure. No matter what means is employed to tie the unique identifier to the device, the digital fingerprint information may provide the same function: a way of referencing all the information about a particular device.

Figure 3:
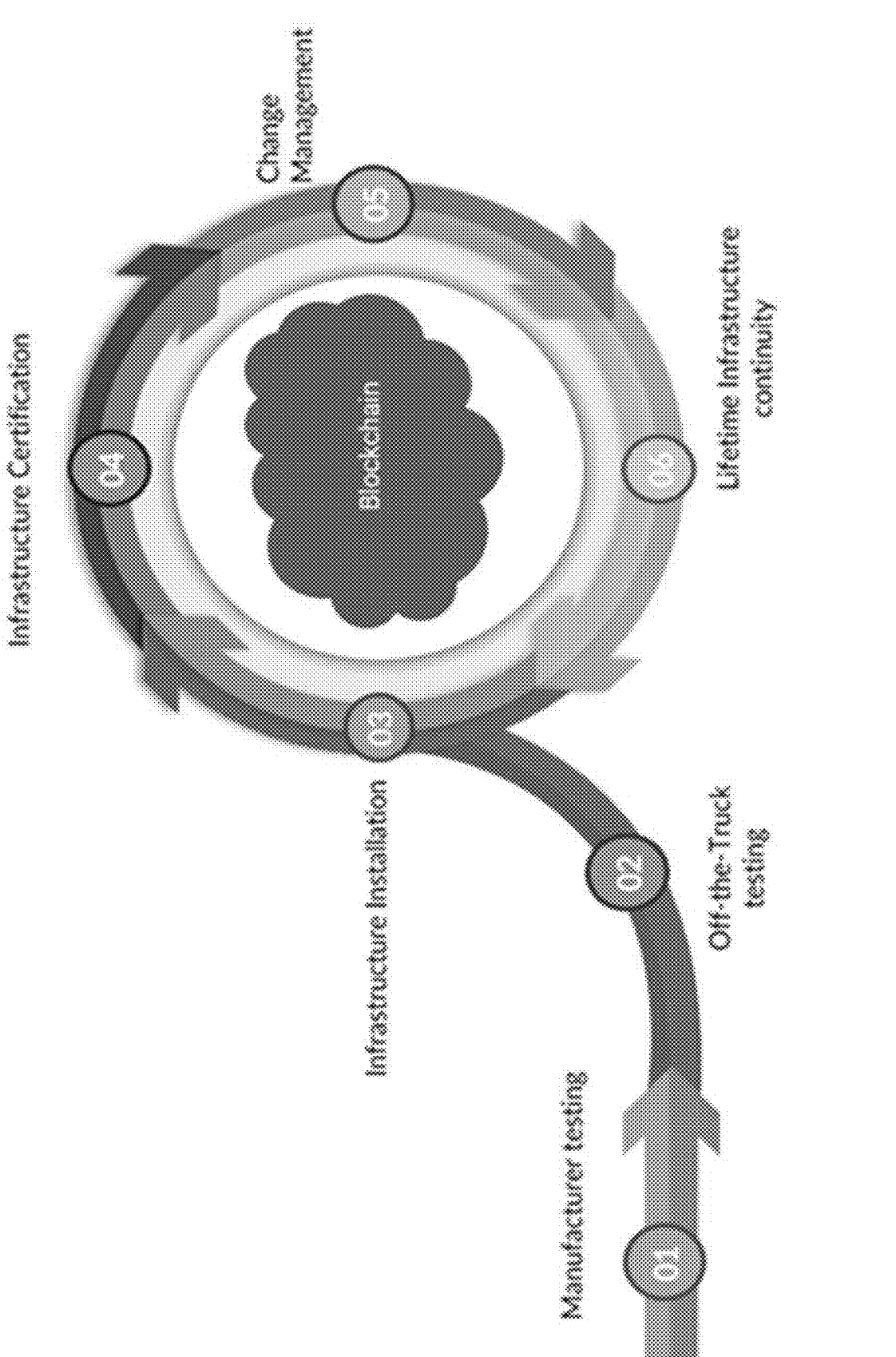
FIG. 3 is a block diagram depicting an example of tracking a lifecycle of a piece of equipment in accordance with example embodiments of the present disclosure.

FIG. 3 is a block diagram depicting an example of tracking the lifecycle of a piece of equipment in accordance with example embodiments of the present disclosure. The flow is exemplary only; there are many possible variants of this flow. In this example, the flow is as follows, with each step documented as blockchain information blocks:

1. A device is manufactured and tested at the factory. The blockchain stores the date of manufacture, part number, revision, software installed, and so on.
2. The device's function is verified prior to installation. A blockchain stores dates, tests run and their results, and location.
3. The device is installed into the telecommunications infrastructure. Date of installation, type of install (small cell, macro, distributed antenna system, for example), and more may be entered into the blockchain.
4. The installation is certified for operation and enters service. Dates, tests run, results of the testing, environmental conditions, and so on, are retained in blockchain.
5. As time passes, the installation is updated and repaired as necessary to continue operation and to provide enhanced services as technology advances. For example, a cell tower may migrate from supporting 4G operation to 5G operation, and beyond. Changes to the equipment, and in particular the device under consideration, are stored in the device's blockchain ledger.
6. Eventually the device is retired due to age or malfunction and is removed and destroyed. The telecom installation may be updated to continue operation or may be retired too if it is no longer required. Either way, the information may be stored in blockchain for the device under consideration—and also for the larger-scale installation itself. The use of blockchain is certainly not restricted to single devices; it may be used to track the lifecycle of an entire installation. As such, a blockchain may be used to track any number of devices (e.g., one device, a million devices, or more).

A convenient and well-organized portal can be provided in accordance with example embodiments to manage all of the device-specific information stored in the blockchain data. This is provided by a device that connects to the blockchain via the Internet or other suitable network connection. It may be a handheld, wireless device such as a tablet or cellphone, or it may be a computer with wired or wireless connection to the Internet. A customized application ("app") running on one of these devices can provide the user interface to the data in the blockchain. A network Application Program Interface (API) may also be used to retrieve and update the blockchain data by secure means.

Figure 4:
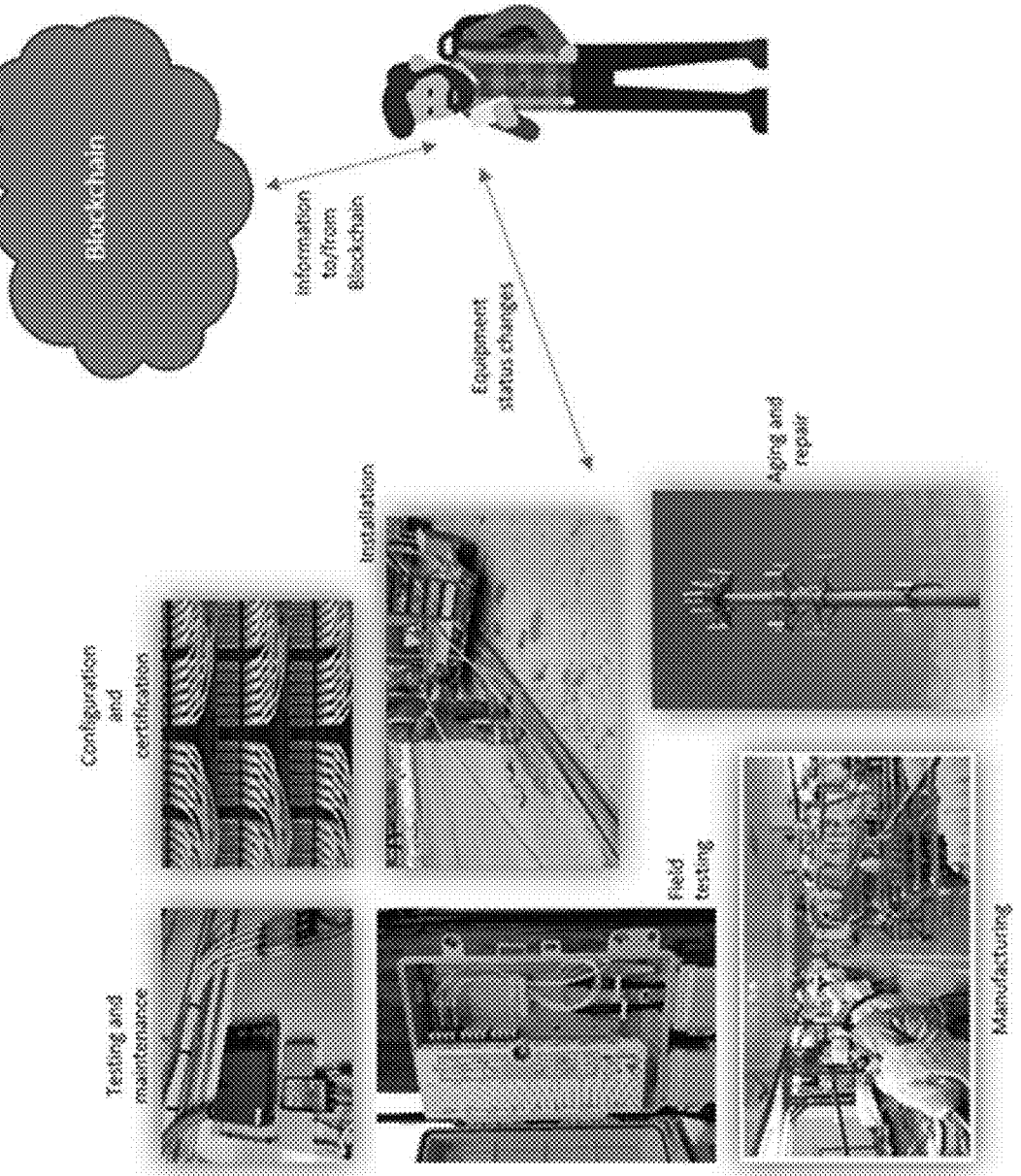
FIG. 4 is a block diagram depicting an update to a blockchain as equipment status changes in accordance with example embodiments of the present disclosure.

FIG. 4 is a block diagram illustrating updating a blockchain as equipment status changes. In the example of FIG. 4, a technician employs a handheld device to update the blockchain information in response to changes in telecommunication infrastructure deployment (manufacture, installation, repair, replacement, updates, etc.).

According to example aspects of the present disclosure, a blockchain exists as data distributed across network servers on the Internet or other network. It is structured as a chain of blocks, with each block comprising two separate types of information. Each block may include a block header containing information linking to the previous block in the chain, the current time, and cryptographic data that renders the block essentially impossible to remove, modify or corrupt. The block body can include the information about the object such as telecom device: the unique identifier of the device; the type of information; and/or other data that is used to fully define the event being documented.

Figure 5:
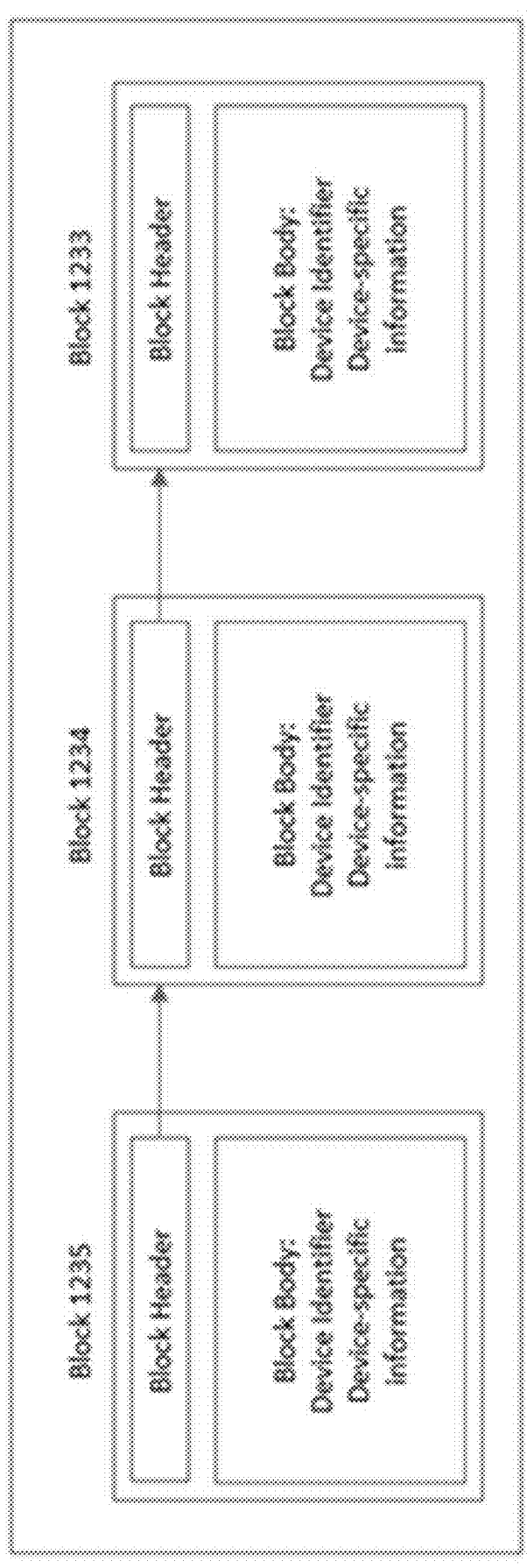
FIG. 5 is a block diagram depicting an example structure of a blockchain in accordance with example embodiments of the present disclosure.

FIG. 5 is a block diagram depicting an example structure of a blockchain in accordance with example embodiments of the present disclosure. It is noted that other blockchains and internal structures may be used. A characteristic of a blockchain is the way it manages data integrity. A blockchain contains, in its block header, mathematical information that renders the data immutable and unchangeable. The widely distributed nature of a blockchain—it essentially exists in many computers simultaneously—protects it from a single computer's security being hacked or compromised in some way. A blockchain's use model of storing transactions such as cybercurrency can be leveraged according to example aspects to provide a strong, permanent, easily accessible means of storing events in a telecommunication device's lifecycle.

Embodiments of the present disclosure may be used to track any physical object. In the telecommunications space, the detailed device-specific tracking of life cycle adds benefit to many application areas.

One example area includes data centers which contain vast arrays of equipment to be installed, tested, and maintained.

As another example, application of embodiments may be provided for factory testing. In a manufacturing environment, there are many devices in different stages of production which are to be tracked and followed carefully.

Yet another example includes outdoor small cells. There are many small cells installed in urban and city environments. Each has multiple devices, cables, connectors, and so on, all of which are to be carefully monitored.

Another example includes cell towers and DAS (Distributed Antenna Systems) installations. Similar to small cells, towers and DAS installs have many components that are to be tracked carefully. This applies to all outside plant installations as well.

A very wide variety of information can be beneficial in describing the history of a single, unique device. An example but non-limiting list of some types of information is provided to illustrate this variety. This list is not intended to be complete as many other types of information may be added and/or removed. Device-specific information includes, but is not limited to:

Unique identification information (digital fingerprint) to link the data to one specific device.

Date and location of manufacture.

Link to manufacturer specifications, reference drawings.

Factory test results.

Shipping source and destination.

Confirmation of shipping the device at the source.

Confirmation of receiving the device at the destination.

Date of transportation/shipping.

Installation date and location.

Reference design files describing correct installation procedures for the device, and expected performance.

Photographs of the installation site.

Progress updates of installation, configuration, and testing by on-site technicians.

Certification of performance after initial installation.

Testing and modifications made during installation.

If the device is a cable, information about any splicing/cutting/modifications made are relevant.

Date and details of updates, repairs, modifications, or changes made to the device.

Date and details of inspections and testing of the installed device. If the device is a cable, this might include TDR (Time Domain Reflectometry) results or VNA (Vector Network Analyzer) results. If the device is a fiber, this might include OTDR (Optical Time Domain Reflectometry) result, end-face inspection results, OLTS (Optical Loss Test Set) results.

QA (Quality Assurance) inspection checklists.

Automatic setup of test equipment. The device is identified by its digital fingerprint, and this information may be used to fully configure a test instrument for the optimal test setup for that device.

Test results and date for any and all test events on the device.

According to example aspects of the disclosed technology, a blockchain may be used as a lifecycle tracking mechanism for any type of object. A blockchain can store, with high-level security, transactions and historical information related to equipment. Not only is it secure, but it is also easy to access from anywhere in the world. Its security and availability provide a secure mechanism to track how equipment is built, installed, maintained, and so on. By providing a blockchain, many improvements are provided when compared with a proprietary database stored in the cloud or on a computer somewhere.

Figure 6:
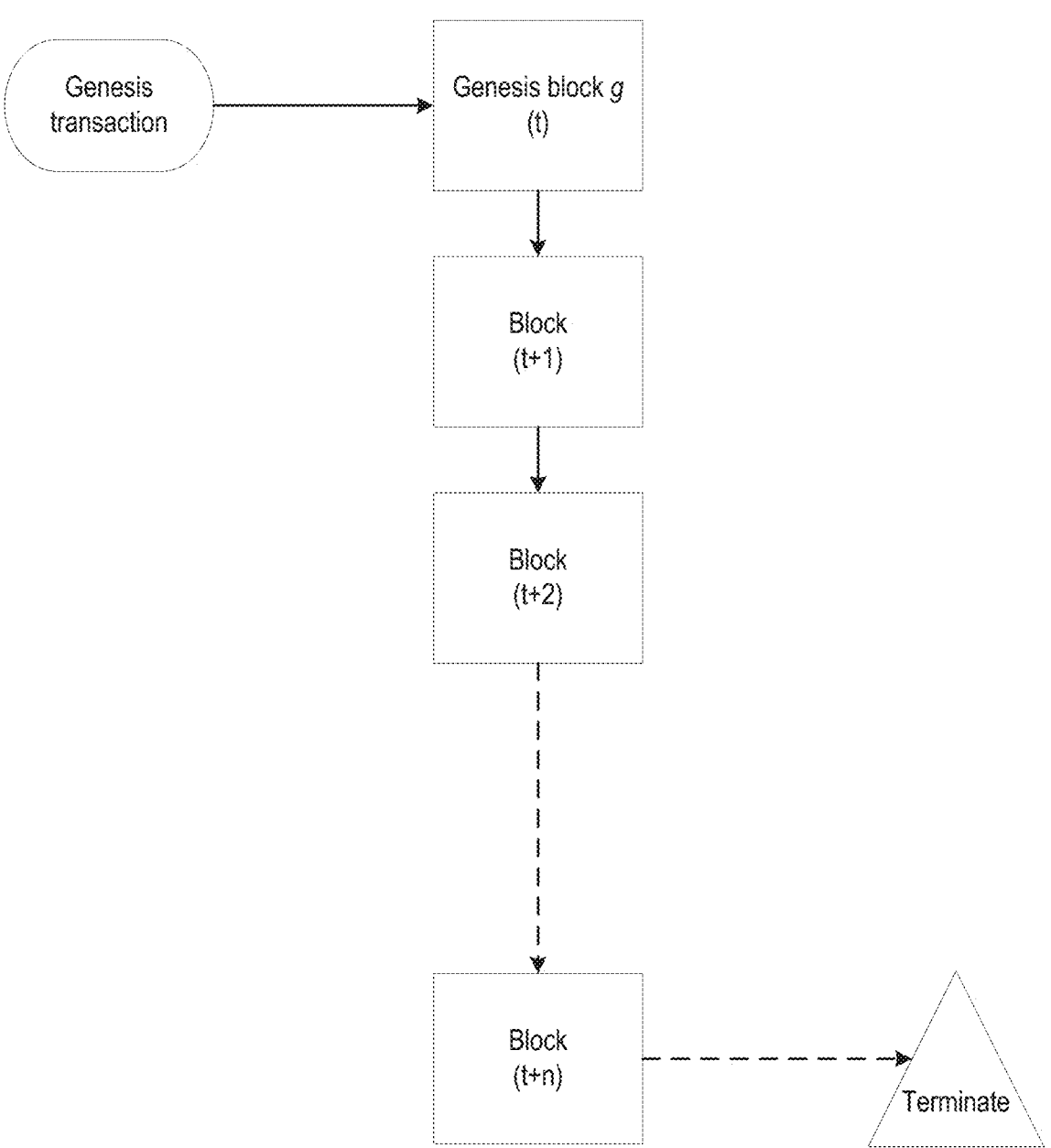
FIG. 6 is a block diagram depicting a blockchain and tracking of an object lifecycle in accordance with example embodiments of the present disclosure.

FIG. 6 is a block diagram depicting a blockchain and tracking of an object lifecycle in accordance with example embodiments of the present disclosure. FIG. 6 depicts a simple block diagram illustrating an example of tracking a single asset. It will be appreciated, however, that a blockchain may be used to track multiple assets in a similar manner. A blockchain can include a genesis block g (t) processed to confirm a genesis transaction. A genesis transaction can indicate a first submission of a digital asset that can create a new distributed ledger, and genesis block g (t) can confirm the genesis transaction in the previous block. In this manner, the genesis block may be the root of trust for the ledger.

In an example, creation of a new distributed ledger is coordinated through a consensus participation protocol. The consensus participation protocol is executed between blockchain processors available to enable the blockchain network.

A blockchain can be created, managed, and terminated according to a lifecycle as shown. Example steps of a lifecycle may include a user defining a new asset that will become the basis for a series of related transactions, and then compiling and submitting the defined asset as genesis transaction to a blockchain network. A genesis transaction can propagate through the blockchain network.

To begin blockchain processing, a genesis block can confirm a genesis transaction and render the asset available to subsequent blocks. The termination of the ledger can result in deletion of the ledger from a consensus pool. In some embodiments, the ledger is archived to "offline" resources after termination.

A genesis transaction is the first submission of a digital asset that can create a new distributed ledger, and a genesis block confirms the genesis transaction and becomes the root of trust for the ledger. A new distributed ledger is created by coordination through a protocol, and the protocol is executed between blockchain processors representing the available servers that enable the blockchain network. A registration process can be used which operates through a centralized or overlay of control elements. Alternatively, the protocol implements a consensus process similar to that utilized by the blockchains themselves. Ledger aging and deletion is a decisions process that triggers removal of a distributed ledger using the consensus participation protocol.

To create a new blockchain, a request for a blockchain can be sent to a network of processors. The request may be transmitted, for example, through a registration process, or alternatively, through a distributed consensus process. The request contains necessary details regarding the nature of the blockchain. After the request is sent, processors will consider the request and determine whether or not to participate (e.g., through a registration process or as part of a consensus process). The blockchain is then created and begins operation, upon which the requester is notified and appropriate notifications may be disseminated so that the blockchain may be used by a target user community.

A blockchain may continue to operate as long as realistically possible, or as long as it is needed. Monitoring of the operational blockchain may be performed to ensure that predetermined security and performance goals are satisfied. A registrant authority or consensus body may intervene to mitigate shortfalls. Once the blockchain is no longer needed, the blockchain may be terminated, and then optionally archived. According to the embodiments disclosed herein, a significant plurality of blockchains may be simultaneously, or near simultaneously, operating.

An archival subprocess can be implemented for a blockchain that has been closed to new transactions. In the archival subprocess, the entire blockchain is evaluated and verified as to satisfactory proof of hashing (e.g., equivalence to previously computed hashes), as well as to the version of the blockchain held by a node.

Once the blockchain tree is verified computationally (as agreed to by consensus for example), the blockchain, the hash, and the archival location(s) can be shared. The blockchain can be verifiably stored and prevented from further alterations, and any subsequent recovery can be computed to determine if the underlying transaction data or blocks have been altered.

FIG. 7 depicts a block diagram of an example computing system 600 that can be used by an object tracking system, mobile computing device, or other systems to implement methods and systems according to example embodiments of the present disclosure. As shown, the computing system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for tracking one or more objects using one or more blockchains.

The memory device(s) 606 can further store data 610 that can be accessed by the processors 604. For example, the data 610 can include blockchain data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

FIG. 8 depicts an example flow diagram for a method of tracking a lifecycle of a telecommunications device according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-2.

A computing device can include one or more processors, memory, one or more sensors and other components that, together, enable the computing device to track a lifecycle of a telecommunications device. The one or more sensors can enable wirelessly detecting communications from telecommunications devices.

The computing device can identify, at 802, by the one or more sensors, a unique identifier associated with the telecommunication device. In some examples, the telecommunication device has an associated RFID tag. The one or more sensors can be configured to receive signals communicated by the RFID tag. The RFID tag can provide data including, but not limited to, the unique identifier.

The computing device can, at 804, receive lifecycle event data based on input from a user, wherein the lifecycle event data describes a currently occurring event in the lifecycle of a telecommunications device. For example, a technician can enter information describing the specific lifecycle event that is currently occurring (e.g., installation, maintenance, diagnostic, and so on). In some examples, the lifecycle event data includes an event code associated with the currently occurring event.

In some examples, the lifecycle event data includes user submitted context data associated with the currently occurring event. For example, a technician can make notes that describe the specific lifecycle event (e.g., the specific repair that was made, particular context for a repair, the specific diagnostic data detected during evaluation, and so on).

In some examples, the computing device can, at 806, automatically generate a log entry including the unique identifier and the lifecycle event data. The computing device can, at 808, add the log entry to a blockchain ledger.

In some examples, each log entry includes a lifecycle event type. The lifecycle event type can represent which type of event, from a plurality of possible event types, is associated with the current event. For example, types of events can include installation, removal, repair, maintenance, diagnostic, and so on.

The computing device can access a plurality of log entries for the telecommunication device based on the identified unique identifier. The computing device can determine, based on user input, a selected lifecycle event type. The computing device can display one or more previous log entries, wherein the one or more previous log entries are selected from the plurality of previous log entries based on the selected lifecycle event type.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computing device to track a lifecycle of a telecommunications device, the computing device comprising:
   one or more processors;
   one or more sensors for wirelessly detecting communications from the telecommunications device and
   a computer-readable memory, wherein the computer-readable memory stores instructions that, when executed by the one or more processors, cause the computing device to perform operations, the operations comprising:
   identifying, by the one or more sensors, a unique identifier associated with the telecommunication device;
   receiving lifecycle event data based on input from a user, wherein the lifecycle event data describes a currently occurring event in the lifecycle of a telecommunications device;
   automatically generating a log entry including the unique identifier and the lifecycle event data; and
   adding the log entry to a blockchain ledger.

2. The computing device of claim 1, wherein telecommunication device has an associated RFID tag.

3. The computing device of claim 1, wherein the lifecycle event data includes an event code associated with the currently occurring event.

4. The computing device of claim 3, wherein the lifecycle event data includes user submitted context data associated with the currently occurring event.

5. The computing device of claim 1, wherein each log entry includes a lifecycle event type.

6. The computing device of claim 5, the operations further comprising:
   accessing a plurality of log entries for the telecommunication device based on the identified unique identifier.

7. The computing device of claim 6, the operations further comprising:
   determining, based on user input, a selected lifecycle event type; and
   displaying one or more previous log entries, wherein the one or more previous log entries are selected from the plurality of log entries based on the selected lifecycle event type.

8. A computer-implemented method of accurately tracking a lifecycle of a telecommunications device, the method comprises:
   identifying, by a computing device with one or more processors, a unique identifier associated with a telecommunication device;
   receiving, by the computing device, lifecycle event data based on input from a user, wherein the lifecycle event data describes a currently occurring event in the lifecycle of a telecommunications device;
   automatically generating, by the computing device, a log entry including the unique identifier and the lifecycle event data; and
   adding, by the computing device, the log entry to a blockchain ledger.

9. The computer-implemented method of claim 8, wherein telecommunication device has an associated RFID tag.

10. The computer-implemented method of claim 8, wherein the lifecycle event data includes an event code associated with the currently occurring event.

11. The computer-implemented method of claim 10, wherein the lifecycle event data includes user submitted context data associated with the currently occurring event.

12. The computer-implemented method of claim 8, wherein each log entry includes a lifecycle event type.

13. The computer-implemented method of claim 12, the method further comprising:
   accessing, by the computing device, a plurality of log entries for the telecommunication device based on the identified unique identifier.

14. The computer-implemented method of claim 13, the method further comprising:

determining, by the computing device and based on user input, a selected lifecycle event type; and displaying, by the computing device, one or more previous log entries, wherein the one or more previous log entries are selected from the plurality of log entries based on the selected lifecycle event type.

15. One or more non-transitory computer readable media that collectively store instructions that when executed by one or more processors cause the one or more processors to perform operations, the operations comprising:

identifying a unique identifier associated with a telecommunication device;

receiving lifecycle event data based on input from a user, wherein the lifecycle event data describes a currently occurring event in the lifecycle of a telecommunications device;

automatically generating a log entry including the unique identifier and the lifecycle event data; and adding the log entry to a blockchain ledger.

16. The one or more non-transitory computer readable media of claim 15, wherein telecommunication device has an associated RFID tag.

17. The one or more non-transitory computer readable media of claim 15, wherein the lifecycle event data includes an event code associated with the currently occurring event.

18. The one or more non-transitory computer readable media of claim 17, wherein the lifecycle event data includes user submitted context data associated with the currently occurring event.

19. The one or more non-transitory computer readable media of claim 15, wherein each log entry includes a lifecycle event type.

20. The one or more non-transitory computer readable media of claim 19, the operations further comprising:

accessing a plurality of log entries for the telecommunication device based on the identified unique identifier.

* * * * *